United States Patent [19]

Tarnay et al.

[11] 4,210,284

[45] Jul. 1, 1980

[54] TEMPERATURE LIMITING DEVICE

[75] Inventors: Matthew G. Tarnay, Pasadena; Sidney K. Krieff, Los Angeles, both of Calif.

[73] Assignee: Price-Pfister Brass Mfg. Co., Pacoima, Calif.

[21] Appl. No.: 944,418

[22] Filed: Sep. 21, 1978

[51] Int. Cl.² ............................................. F16K 17/38
[52] U.S. Cl. ..................................... 239/75; 137/468; 222/54; 236/93 B
[58] Field of Search ................. 239/75; 222/54; 4/192, 4/194; 137/468; 236/93 R–93 B, 99 R, 99 H, 99 J, 101 R, 102; 188/277; 119/73

[56] References Cited

U.S. PATENT DOCUMENTS

| 1,877,510 | 9/1932 | Hughes | 137/468 X |
| 3,368,758 | 2/1968 | Fraser | 236/93 B |
| 3,938,741 | 2/1976 | Allison | 239/75 |

Primary Examiner—Andres Kashnikow
Attorney, Agent, or Firm—Flam & Flam

[57] ABSTRACT

A control valve is placed between a water supply pipe and a delivery device such as a tub spout or a shower head. The control valve includes a cylinder open at the discharge end. The supply line is connected to the other end of the cylinder by a series of radial inlet ports. A slide closure in the cylinder moves to open and at least partially to close the inlet ports by a thermal sensor located upstream of the valve. The closure freely passes water on opposite sides so that the closure is balanced and unaffected by fluid pressure. Resetting of the control valve is quickly achieved as soon as safe conditions are sensed under reduced flow conditions.

1 Claim, 5 Drawing Figures

TEMPERATURE LIMITING DEVICE

TECHNICAL FIELD OF INVENTION

This invention relates to plumbing fixtures, and particularly to an antiscald shutoff valve for showers and tub spouts such as shown in U.S. Pat. No. 3,938,741 issued Feb. 17, 1976 to Allison.

BACKGROUND ART

U.S. Pat. No. 3,938,741 issued to Allison shows and describes a thermal shutoff valve for a shower in which a sensing element in the flow path moves a closure disc against the seat. Allison stresses the feature that the dynamic water pressure assists in achieving a rapid closure. A small bypass produces a harmless stream. Adjustment of control valves results in the sensing element reversing the force on the closure disc. However, the very forces that assisted in achieving a rapid closure of the valve operated to impede the rapid reset of the mechanism. Thus, the water pressure on the closure is a significant force to overcome. The return spring must overcome this pressure as well as the friction of the power element. The reset time accordingly varies widely.

U.S. Pat. No. 1,877,510 to Hughes shows an antiscald device in which the sensing element is downstream of the control valve. The sensing element is therefore not intimately associated with the reduced flow of water in the near shutoff position. This results in a very slow reset time. The primary object of the present invention is to provide a thermal shutoff valve that restricts flow within a very short period of time following rise in water temperature above a critical level, and that very promptly resets the shutoff valve for full normal operation following reduction of temperature below the critical point. A five second period is rapid for shutoff; a twenty second period is prompt for reset.

DISCLOSURE OF THE INVENTION

The foregoing object is accomplished by utilizing a sleeve valve that opens without restriction at the discharge end, and that slidably controls valve openings at the other, the sensing element being located upstream of the valve openings.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
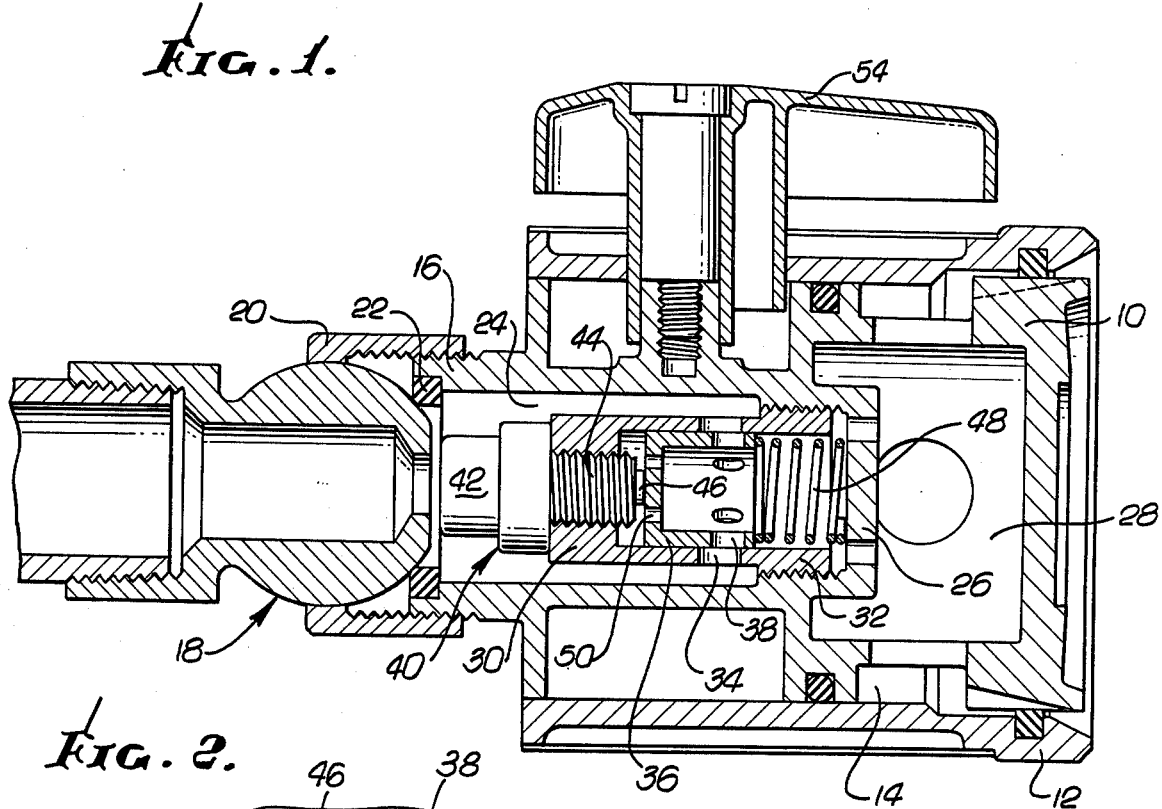
FIG. 1 is a longitudinal sectional view of a shower head incorporating the present invention.

In FIG. 1, there is illustrated a hollow shower head body 10 surrounded by a spray adjusting sleeve 12. Water emerges from the body 10 at a peripheral channel 14 for passage frontally between the body 10 and the sleeve 12 all in a well understood manner.

The shower head body 10 has a posterior threaded nipple 16 drawn into yielding frictional engagement with a conventional ball fitting 18 by the aid of a retaining nut 20. A washer 22 fitted in the end of the nipple 16 is positioned to be compressed between the coupled parts. The nipple 16 defines the entrance to a control chamber 24. Water is normally permitted to flow from the chamber at a rate of several gallons per minute to form a shower stream. A ported wall 26 defines the inner end of the chamber and separates the chamber from a large hollow frontal compartment 28 that communicates with the peripheral channel 14.

In order for shower water to reach the ported wall 26, it must pass around the closed end of a cylinder 30 located in the control chamber. The cylinder 30 is part of the thermal valve that controls the water flow. The cylinder 30 has a threaded collar 32 at one end that attaches to interior threads at the inner end of the control chamber 24. Water passes inwardly through peripheral openings 34 in the cylinder.

A valve hollow control member or slide 36 is fitted inside the cylinder. The slide is movable either to block or to unblock the cylinder openings. In the position shown in FIG. 1, the slide 36 is retracted, in which position water flows into the slide 36 through openings 38 aligned with the openings 34 of the cylinder. The open right hand end of the slide 36 conducts water to the ported wall 26 for flow to the frontal compartment 28 and outwardly of the shower head.

In the event that the temperature of the shower water exceeds a certain value, say 120° Farenheit, the slide 36 rapidly advances to move the openings 34 and 38 out of registry thus to restrict the water flow. A thermal sensing element 40 is provided for this purpose. The thermal element 40 includes a case 42 of high thermal conductivity containing a material that changes from a solid phase to a liquid phase within a narrow temperature band. The thermal element 40 has a hollow threaded attachment stem 44 that extends through the end wall of the cylinder 30, positioning the case 42 directly in the path of water entering the control chamber 24 via the ball fitting 18.

The thermal element 40 is closed by a piston 46 slidable in the attachment stem 44 and positioned to abut the closed end of control slide 36. Accordingly, as the material in the case undergoes rapid expansion, as it changes from a solid to a liquid phase, the piston 46 advances the control slide to restrict flow. Excessively hot water is thereby prevented from contacting the bather.

A prestressed return spring 48 interposed between the end wall 26 of the control chamber and the inner end of the control slide 36 maintains the control slide in following relationship with the piston 46. Openings 50 in the end wall of the control slide 36 completes a passage for free flow of water between opposite ends of the control slide, thereby allowing the control slide to move in accordance with the position of the piston 46 and independently of the pressure of the water.

Figure 2:
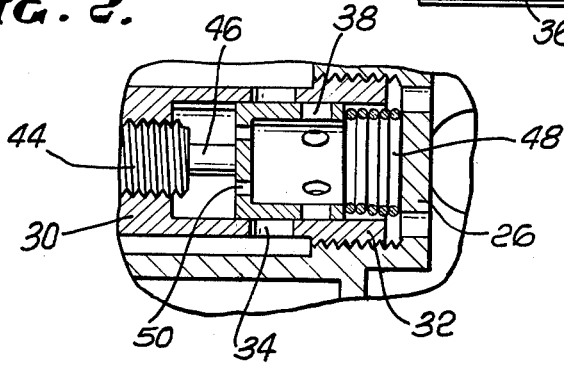
FIG. 2 is a fragmentary sectional view similar to FIG. 1, but showing the valve in its shut off position.

In the closed position of the valve (see FIG. 2), the flow is reduced from about four to six gallons per minute adequate to produce a good shower stream, to a low value, say about one half a gallon per minute. The low flow rate is inadequate to produce a full shower reduced flow, rather than complete stoppage, results from a slight clearance between the slide 36 and cylinder 30. Optionally, small bypass ports could be provided through the cylinder or through the control slide to allow a bypass flow. Bypass flow is required to allow the thermal element to reset when the temperature is reduced to a safe level.

The user adjusts the control valves (not shown) to change the ratio of hot to cold water while the drip stream continues. Depending upon how long the line is from the control valves to the shower head, and the amount of hot to cold ratio adjustment made, and depending upon what the supply pressure, is the temperature of the water at the sensing element 40 reduces to below 120° Farenheit and the material reverts back to its solid phase. The return spring 48 causes the slide to follow, aligning openings 38 with openings 34. Full water flow to the end device results.

The resetting of the mechanism takes place rapidly because the sensing element 40 is upstream of the control valve and at all times is immersed in the water stream for effective heat transfer during both high and low flow conditions. Since the control slide 36 is a cylinder ported through openings 50, water pressure, be it high or low, is always equal on opposite sides. Hence, the slide is balanced and the return spring need not overcome or be aided by any hydraulic forces. The shower head in the present instance includes a conventional eccentric spray adjusting handle 54 that shifts the spray adjusting sleeve back and forth.

DESCRIPTION OF ALTERNATIVE EMBODIMENTS

Figure 3:
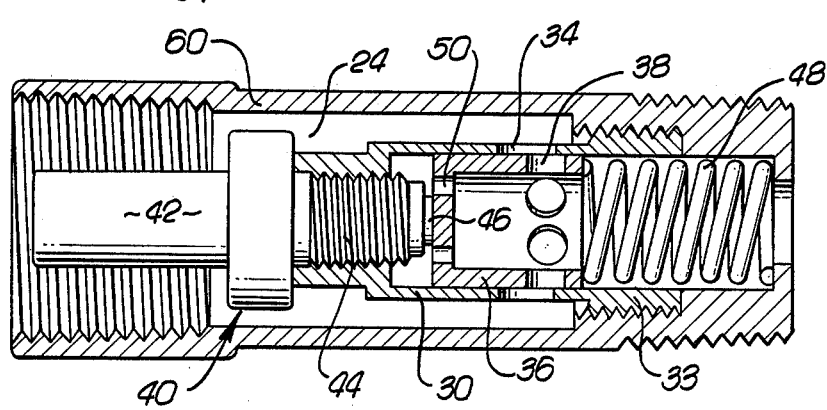
FIG. 3 is a longitudinal sectional view of an adapter structure designed to be serially inserted between the supply pipe and the discharge device.
Figure 4:
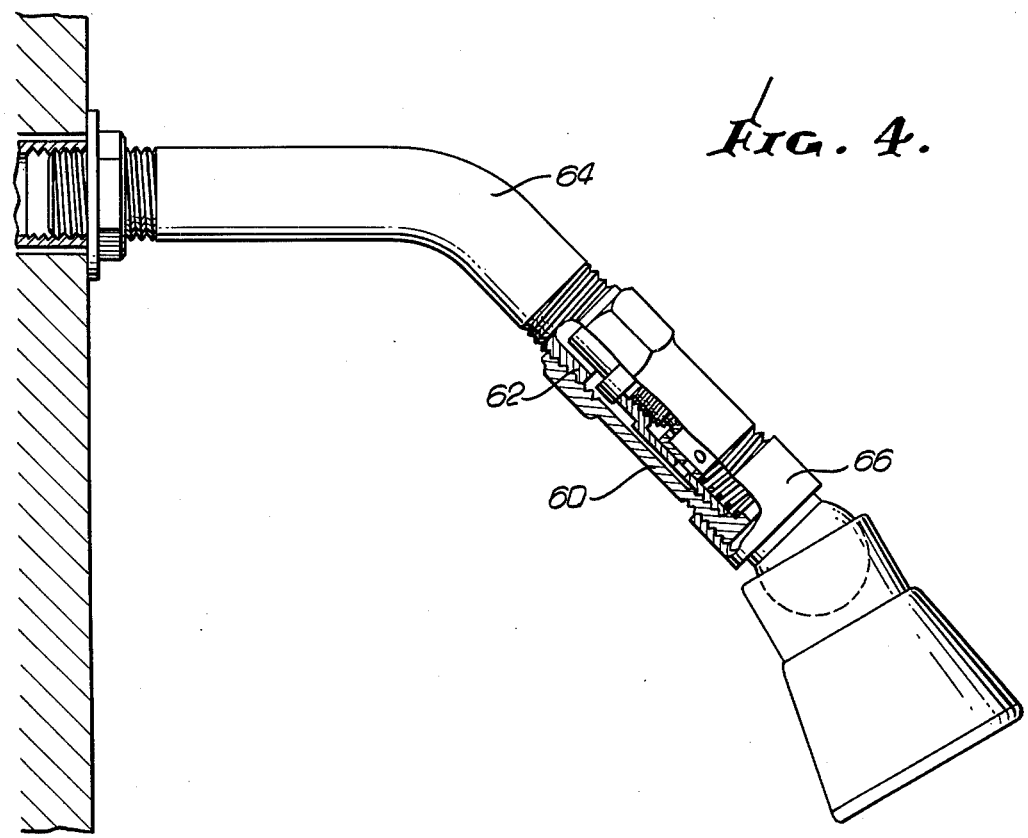
FIG. 4 illustrates the adapter of FIG. 2 installed at a shower location.

The thermal sensing element of FIG. 3 is identical in operation to that shown in FIG. 1, except that its case 60 is designed to be inserted into an existing system. Thus, the case 60 is internally threaded at one end to fit the threaded end 62 (FIG. 4) of a conventional shower arm 64 at the shower location. The other end of the case is externally threaded to cooperate with the conventional ball fitting 66 of a shower head or bathing device. The case 60 provides a control chamber and associated mechanism for operation in a manner described in connection with the form first described.

Figure 5:
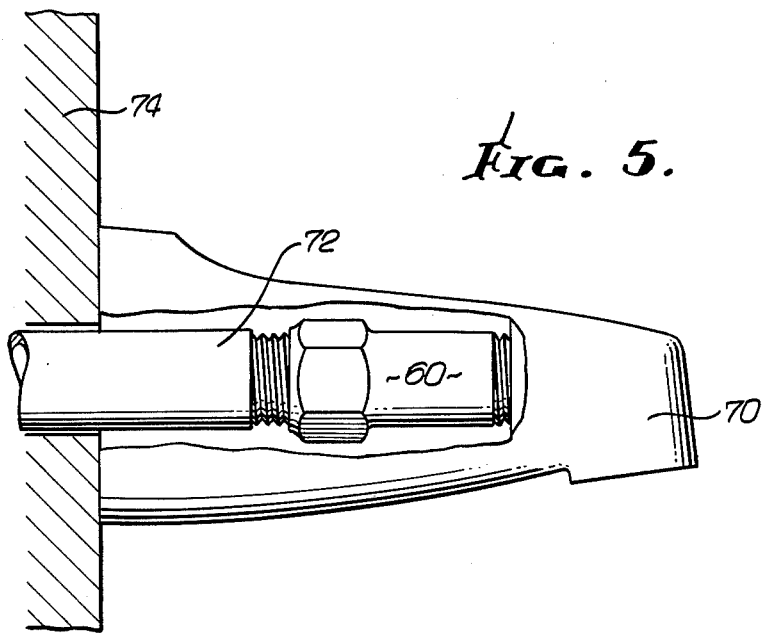
FIG. 5 illustrates the adapter of FIG. 2 installed at a tub spout location.

The case may also be used with other delivery devices. In FIG. 5, the case 60 is shown installed at a tub spout 70. The case 60 simply forms an extension of the nipple 72 that projects from the wall. The spout has a forward wall provided with a threaded opening whereby the spout may be attached. The spout is screwed down until the base end abuts the wall 74. The antiscald operation is the same.

Intending to claim all novel, useful and unobvious features shown or described, we make the following Claim:

1. In a temperature limiting device:
  (a) means forming a control chamber having an inlet at one end adjusted to connect with a source of water for bathing and an outlet at the other end adapted to connect with a water delivery device;
  (b) a cylinder mounted in the control chamber and having one end facing the inlet, and its other end communicating with said outlet, said cylinder having peripheral openings defining a path of water from the inlet, about the cylinder, through the cylinder openings to said other end of the cylinder and said outlet;
  (c) a control member in the cylinder and slidable therein to open and to restrict said path of water, said control member having uninterrupted passage means freely to conduct water from said one end of said cylinder, through said control member to the open end of the cylinder to equalize fluid pressure on said control member;
  (d) a thermal sensing element attached to the exterior of said one end of said cylinder and positioned to be exposed to the path of water between said inlet and said cylinder openings, said sensing element having a part movable to engage said control member to move said control member to restricting position;
  (e) a return spring engaging said control member to maintain said control member in following relationship with said sensing element part;
  (f) restricted flow past said sensing element causing said sensing element to be responsive to the readjusted mix temperature at a place upstream of the control member whereby the pressure balanced control member rapidly resets to full flow.

* * * * *